(12) United States Patent
Giusti

(10) Patent No.: US 9,045,179 B2
(45) Date of Patent: *Jun. 2, 2015

(54) TRACK MEMBER FOR A TRACK OF A TRACKED VEHICLE

(71) Applicant: USCO S.p.A., Modena (IT)

(72) Inventor: Alessandro Giusti, Modena (IT)

(73) Assignee: USCO S.p.A., Modena (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,834

(22) Filed: May 10, 2013

(65) Prior Publication Data

US 2013/0241277 A1 Sep. 19, 2013

Related U.S. Application Data

(63) Continuation of application No. 13/258,307, filed as application No. PCT/IT2009/000292 on Jul. 2, 2009.

(30) Foreign Application Priority Data

Mar. 30, 2009 (IT) .............................. MI2009A0503

(51) Int. Cl.
*B62D 55/088* (2006.01)
*B62D 55/21* (2006.01)

(52) U.S. Cl.
CPC .............. *B62D 55/088* (2013.01); *B62D 55/21* (2013.01)

(58) Field of Classification Search
CPC .... B62D 55/088; B62D 55/21; B62D 55/211; B62D 55/092
USPC ........... 305/59, 102, 103, 104, 105, 106, 117, 305/200, 201, 202, 203, 204
See application file for complete search history.

(56) References Cited

U.S. PATENT DOCUMENTS

| | | | |
|---|---|---|---|
| 3,492,054 A | | 1/1970 | Boggs et al. |
| 4,042,065 A | * | 8/1977 | Crum ............................ 184/109 |
| 4,150,856 A | | 4/1979 | Hakkenberg et al. |
| 5,183,318 A | | 2/1993 | Taft et al. |
| 2002/0135134 A1 | | 9/2002 | Yamamoto et al. |
| 2008/0265667 A1 | * | 10/2008 | Livesay ........................ 305/202 |

* cited by examiner

*Primary Examiner* — S. Joseph Morano
*Assistant Examiner* — Jean Charleston
(74) *Attorney, Agent, or Firm* — Dickstein Shapiro LLP

(57) ABSTRACT

A track member for a track of a vehicle of the tracked type, which comprises a pin, a bushing associated with and rotatable relative to the pin, and first and second inner and outer track link assemblies associated with and rotatable relative to the pin, and arranged on opposite sides of the bushing. The first inner track link assembly is arranged between the first outer track link assembly and the bushing, and the second inner track assembly is arranged between the second outer track link assembly and the bushing. The first and second inner track assemblies each include a ring rotatable relative to the pin. The track member further includes first and second inner and outer gasket seats which house respective gaskets. The inner and outer gaskets are orientated so that they act against side surfaces of the rings.

14 Claims, 12 Drawing Sheets

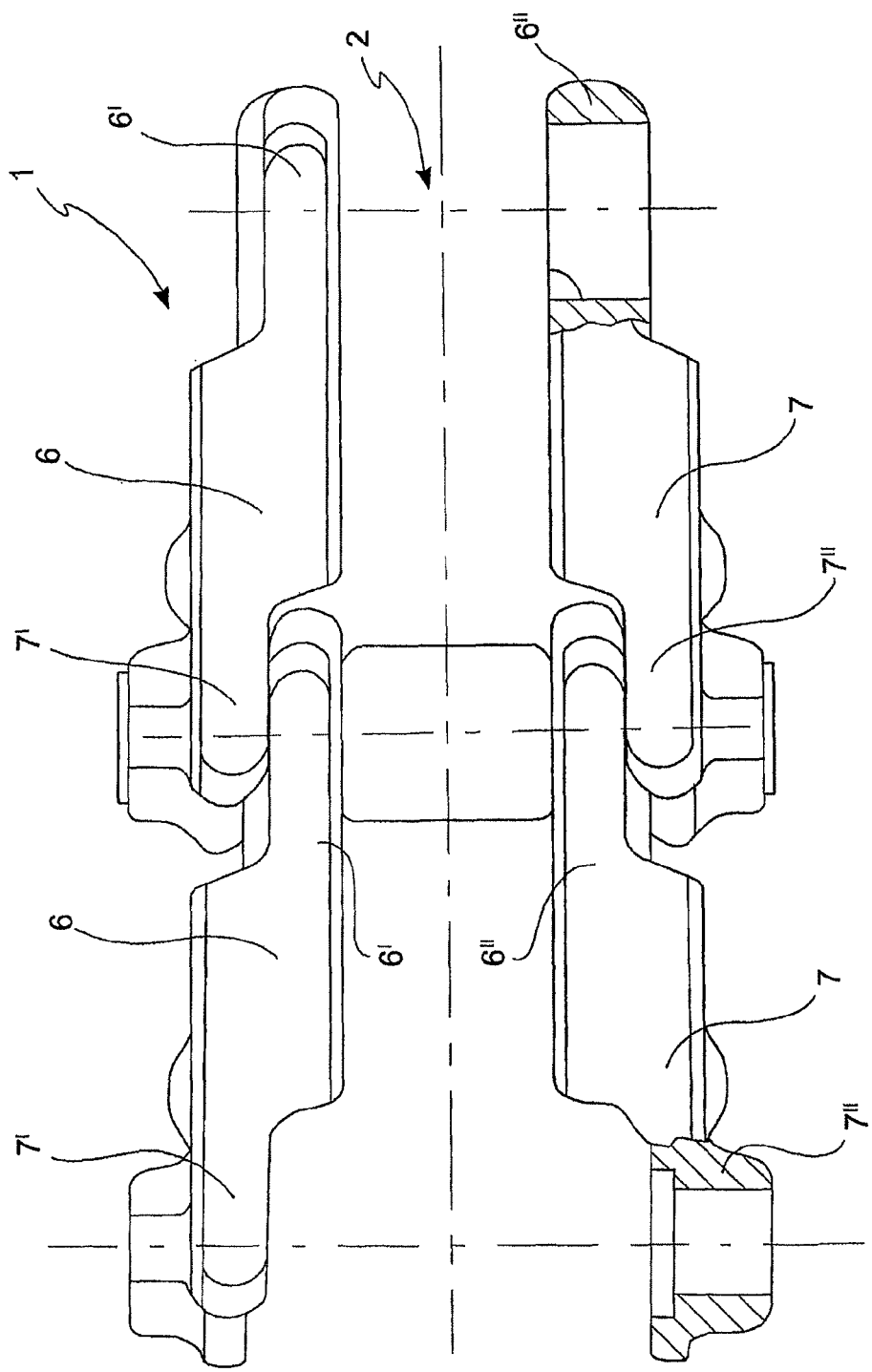
FIG. 1a (state of the art)

TRACK MEMBER FOR A TRACK OF A TRACKED VEHICLE

This is a continuation of application Ser. No. 13/258,307, filed on Sep. 26, 2011, which is a 371 of International Application No. PCT/IT2009/000292, filed on Jul. 2, 2009, which claims priority to Italian Application No. MI2009A000503, filed on Mar. 30, 2009.

BACKGROUND OF THE INVENTION

1. Field of the Invention

The present invention relates to a track member for a track of a tracked vehicle.

2. Description of the Related Art

Tracked vehicles such as, for example, hydraulic excavators, bulldozer, or the like, are provided with handling tracks suitable to allow them to move on broken or steep grounds with ease and controllability.

The tracks comprise articulations of tracks in which inner and outer track links, or portions of inner and outer offset track links, are interconnected on two track sides at predetermined intervals, and are assembled in respective track shoes arranged on the ground contact side. The inner and outer track links are endlessly interconnected by track members acting as connecting members.

To the aim of implementing the above-mentioned connection between track links, several types of track members are known.

An example of track member is described in the U.S. Pat. No. 5,183,318.

Such track member comprises a pin and a bushing that is rotatable relative to such track. The inner track links include inner rings rotatably connected to the pin, and the very track links, which are secured in a rotatingly integral manner, for example, by pressure, on the rings. Instead, the outer track links are secured in a rotatingly integral manner to the pin at external positions of the latter.

Between the inner track links and the pin, first inner gasket seats receiving first gaskets are defined, while between the outer track links and the pin second gasket seats receiving second gaskets are defined. The gaskets act so as to prevent the leakage of lubricant material that is necessary to allow, with reduced wear, the rotations of the bushing relative to the pin and the rings relative to the pin.

Inner spacer members acting between the rings and the bushing are arranged in the inner gasket seats, while outer spacer members acting between the rings and the outer track links are arranged in the outer gasket seats.

However, such track members according to the prior art are not free from drawbacks.

In use, the track members are generally subjected to very high loads. Due to their configuration, in the track members according to the described prior art, the axial loads generated in use by the inner track links and the outer track links completely discharge on the inner spacer members acting between the bushing and the rings. Therefore, the inner spacer members have to be so dimensioned as to be able to withstand such high loads. This involves overall dimensions due to the sizing of the inner spacer members, which are received in inner gasket seats which also will have to be dimensioned while taking into account the dimensions of the spacer members.

A further drawback of the track members according to the prior art consists in that, in use, the pin tends to slip off the track links. In order to obviate this, it is necessary to provide for additional members, such as retaining rings, pegs, or the like.

SUMMARY OF THE INVENTION

Therefore, the object of the present invention is to provide a track member such as to at least partially overcome the drawbacks cited with reference to the prior art.

Particularly, the object of the present invention is to provide a track member with an improved distribution of the loads that are transmitted from the exterior in use.

Further object of the present invention is to provide a track member in which the pin withdrawing phenomenon is substantially prevented.

These and other objects are achieved by a track member described below.

BRIEF DESCRIPTION OF THE DRAWINGS

In order to better understand the invention and appreciate the advantages thereof, some exemplary, non-limiting embodiments thereof will be described herein below, with reference to the annexed Figures, in which:

FIG. 1a is a perspective schematic view of a track of the offset type;

FIG. 10b is a sectional schematic view of a detail of the track member in FIG. 10a;

DETAILED DESCRIPTION OF THE PREFERRED EMBODIMENTS

With reference to FIG. 1, a track is generally indicated with reference number 1.

The track 1 is intended to be applied on a tracked vehicle (not shown in the Figures), such as, for example, a hydraulic excavator, a bulldozer, or the like, so as to allow it to easily move on broken or steep grounds.

The tracks, or chains, can be of two types: offset, or "offset type", and symmetric or "symmetric type".

The offset type tracks have a plurality of symmetric track links 6, 7 that are specularly identical and arranged mutually parallel to form a length of track and interconnected by joints. Each track link is shaped so that each track link has an inner seat, or bushing seat, and an outer seat, or pin seat, mutually offset so that the outer or pin seat of the track link results to be outside or external relative to the inner or bushing seat of the successive track link, which is arranged on the same side of the pin (FIG. 1a).

Figure 1B:
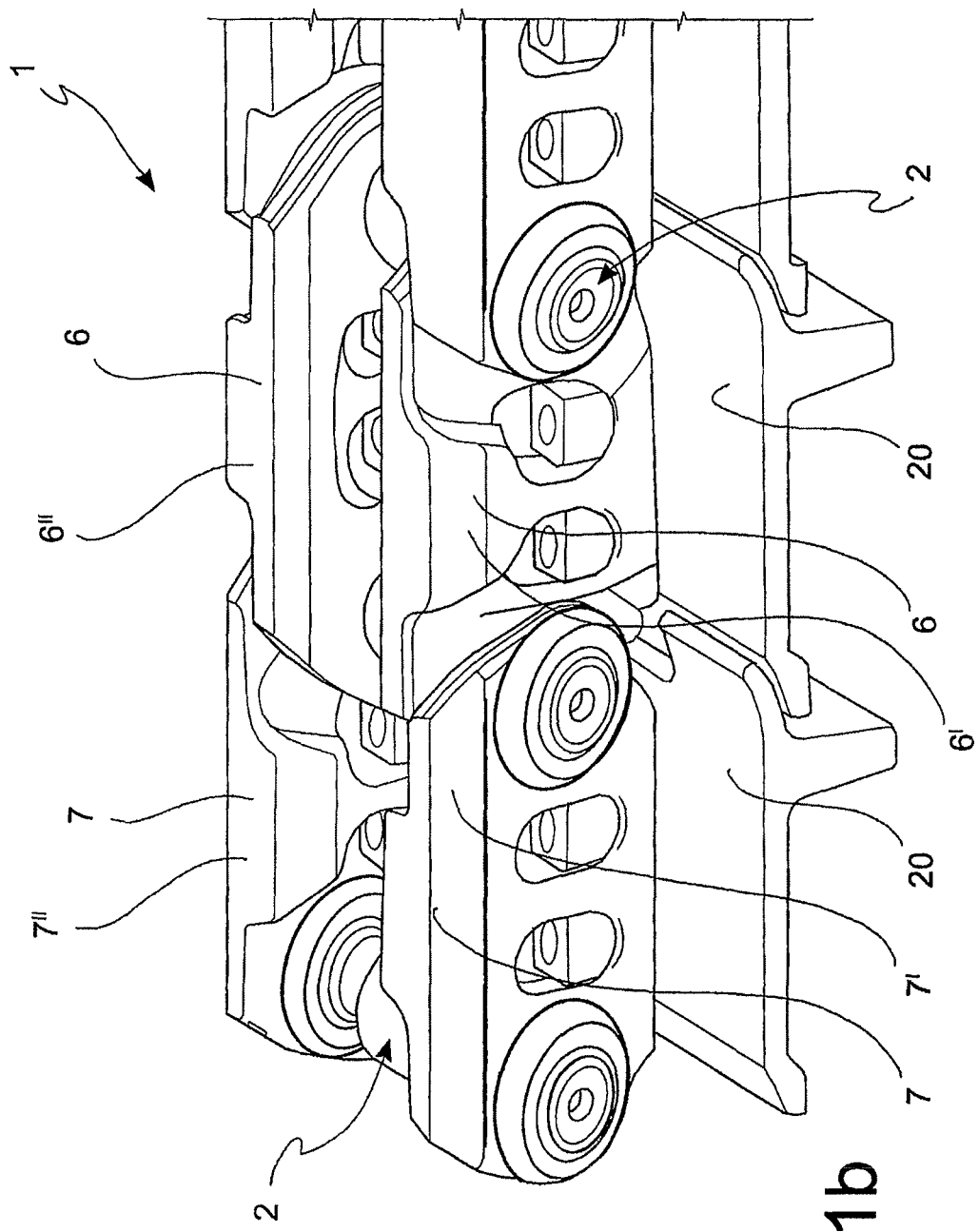
FIG. 1b is a perspective schematic view of a track of the symmetric type.

The symmetric tracks have inner track links 6' and 6" and outer track links 7' and 7", both being present specularly identical to form parallel portions of lengths of the track. The outer track link has two outer or pin seats, while the inner track link has two bushing or inner seats (FIG. 1b).

Hereinafter, by the term inner track link 6' and 6" is meant either the inner portion of a track link for offset track, or an inner track link of a symmetric track. By the term outer track link 7' or 7" is meant either the outer portion of a track link for offset track, or an outer track link of a symmetric track.

The track 1 comprises articulations of tracks provided with inner track links 6 and outer track links 7. Such inner track links 6 and outer track links 7 are interconnected one to the other on two opposite sides of the track 1 at predetermined intervals, and are assembled in respective track shoes 20 intended to contact the ground and so configured as to ensure an efficient grip to the latter. The inner and outer track links are endlessly interconnected by the use of track members 2 according to the invention, acting as connecting members for the track links.

Figure 2:
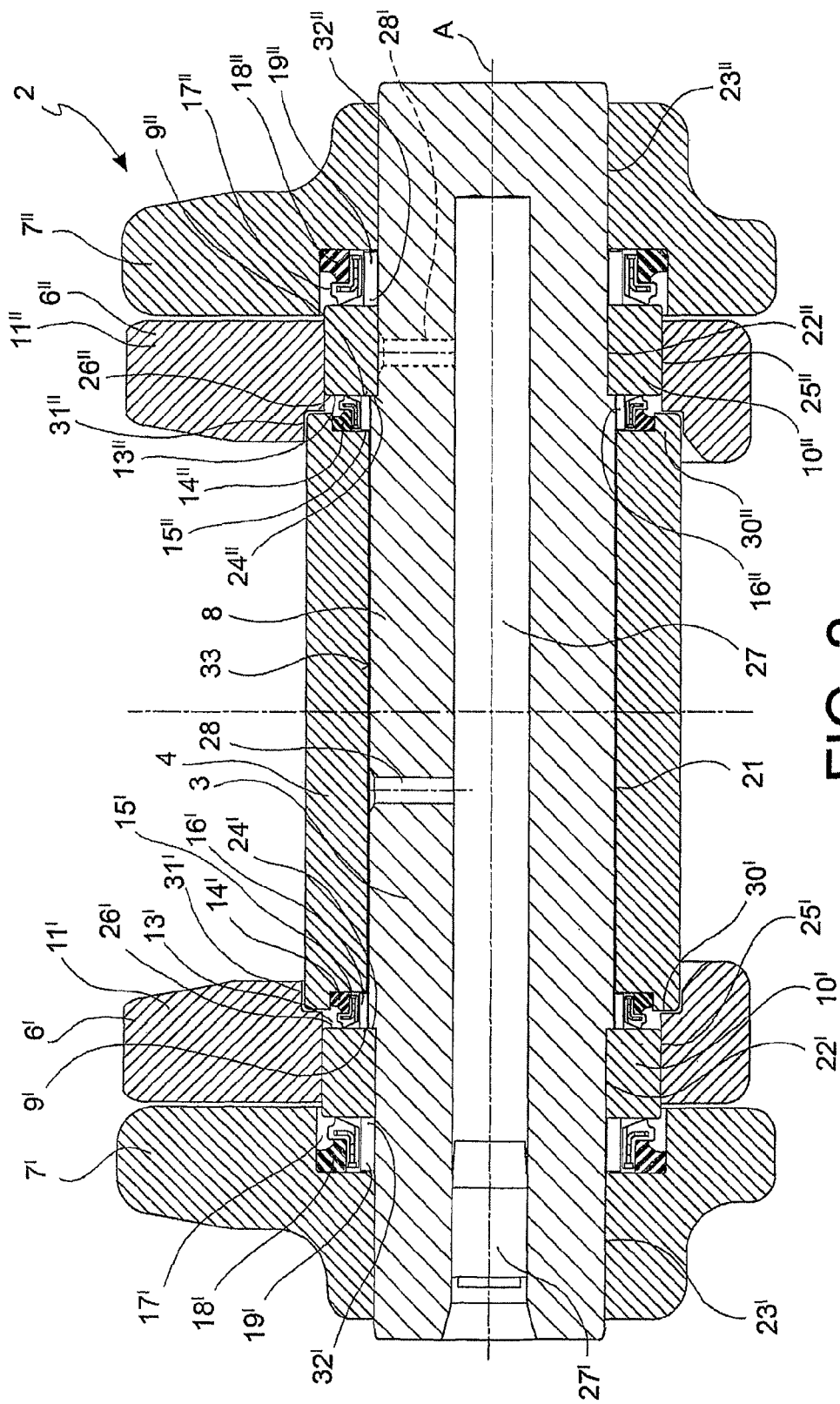
FIG. 2 is a sectional schematic view of a track member according to the invention.

With reference now to FIG. 2, the track member 2 according to the present invention comprises a pin 3, and a bushing 4 associated to the pin 3. Particularly, the bushing 4 comprises a tubular body defining therein a bushing pin seat 21 suitable to receive the pin 3 itself with a clearance. In this manner, the bushing 4 is capable of performing rotations relative to the pin 3 about the axis A of the latter.

The track member 2 further comprises a first 6' and a second 6" inner track link assemblies (implementing the inner track links 6 described with reference to FIG. 1) and which can have different configurations, as it will be described in detail herein below.

The first 6' and the second 6" inner track link assemblies are also associated to the pin 3 so as to be wholly rotatable relative to the latter. Particularly, they define a first 22' and a second 22" inner track link pin seats, respectively, into which the pin 3 is inserted with clearance. In this manner, the first 6' and the second 6" inner track link assemblies can also perform rotations relative to the pin 3 about the axis A of the latter.

The first 6' and the second 6" inner track link assemblies are arranged on two opposite sides of the bushing 3, which therefore results to be positioned between the latter.

The track member 2 further comprises a first 7' and a second 7" outer track link assemblies associated to the pin 3. Particularly, they comprise a first 23' and a second 23" outer track link pin seats, respectively, in which the pin 3 is inserted with interference (or in any case locked), so that the first 7' and the second 7" outer track link assemblies are rotatingly integral to the pin 3, and therefore that are capable of performing rotations therewith about the axis A relative to the bushing 3, as well as relative to the first 6' and the second 6" inner track link assemblies.

The outer track link assemblies 7' and 7", the inner track link assemblies 6' and 6", and the bushing 4 are associated to the pin 3 and arranged one to the other so that the first inner track link assembly 6' is arranged between the first outer track link assembly 7' and the bushing 3, and the second inner track link assembly 6" is arranged between the second outer track link assembly 7" and the bushing 3.

Advantageously, the pin 3 comprises an extended portion 8 defining a first abutting surface 9' and a second abutting surface 9" against which the first 6' and the second 6" inner track link assemblies respectively abut.

In other words, the pin 3 extended portion 8, and particularly the abutting surfaces 9' and 9", implement axial constraints such as to prevent sliding movements of the inner track link assemblies 6' and 6" relative to the pin along the axis A. In fact, inwardly (that is, towards the bushing) movements of the first inner track link assembly 6', corresponding to outwardly (that is, moving away from the bushing) movements of the second inner track link assembly 6", are prevented by the first abutting surface 9', while inwardly (that is, towards the bushing) movements of the second inner track link assembly 6", corresponding to outwardly (that is, moving away from the bushing) movements of the first inner track link assembly 6', are prevented by the second abutting surface 9". Therefore, it shall be apparent that, thanks to the presence of the extended portion 8, withdrawals of the pin from the track links are substantially prevented. Therefore, the presence of auxiliary members, such as retaining rings or pegs, is not required.

A further beneficial effect of the presence of the extended portion 8 is that the pin 3 has an increased flexure resistance. Therefore, the flexures of the pin 3 within the bushing pin seat 21 are reduced, and affect in a limited manner the bushing 4 strength.

A further advantage related to the presence of the extended portion 8 consists in that the axial loads deriving from the track links partially discharge on the pin 3. This involves a better distribution of the loads in the case that further components are provided in the track member, which, in the track members according to the prior art, are subjected almost to the whole load of the track links (for example, the inner spacer members). This aspect will, be elucidated when describing some preferred embodiments of the invention.

In accordance with a possible embodiment, the extended portion 8 of the pin 3 and the pin 3 itself have cylindrical configurations. Particularly, the pin 3 extended portion 8 is substantially coaxial to the pin 3 (and therefore they share the axis A) and has a greater diameter than the diameter of the latter. In this manner, the first 9' and the second 9" abutting surfaces result to have annular configurations. Preferably, also the first 6' and the second 6" inner track link assemblies have, in turn, surfaces comprising annular-shaped surface portions which are entirely in contact with the first and the second abutting surfaces 9' and 9". Particularly, advantageously, the first inner track link assembly 6' comprises a first annular contact surface 24' entirely in contact with the first abutting surface 9', while the second inner track link assembly 6" comprises a second annular contact surface 24" entirely in contact with the second abutting surface 9". In this manner, it is ensured that the axial loads deriving from the track links are discharged sufficiently evenly on the pin 3, thus limiting the flexures thereof.

In accordance with a preferred embodiment of the track member 2, the first inner track link assembly 6' comprises a first ring 10' and a first inner track link 11', while the second inner track link assembly 6" comprises a second ring 10' and a second inner track link 11".

The first 10' and the second 10" rings are rotatable relative to the pin. Particularly, such rings 10' and 10" define the respective inner track link pin seats 22' and 22" previously described.

The first 11' and the second 11" inner track links are in turn associated to the first 10' and the second 10" rings, respectively, and are rotatingly integral thereto. For example, the first inner track link 11' can define a first ring seat 25' therein receiving, thus locking it, the first ring 10', and the second inner track link 11" can define a second ring seat 25" therein receiving, thus locking it, the second ring 10". The rings 10' and 10" can be respectively inserted in the ring seats 25' and 25" for example, by interference coupling. Thanks to such configuration, the rings 10' and 10" are the only members requiring a good finishing and a high surface hardness. In this manner, the production costs for the track member 2 result to be contained.

Advantageously, the first 10' and the second 10" rings are positioned so as to abut against the first abutting surface 9' and the second abutting surface 9", respectively. Particularly, the first contact surface 24' and the second contact surface 24", previously described, are preferably inner side surface portions of the rings 10' and 10" (respectively of a first inner side surface 26' of the first ring 10', and a second inner side surface 26" of the second ring 10").

In order to aid the relative rotations between the bushing 4 and the pin 3, as well as between the inner track link assemblies 6' and 6" and the pin 3, the track member 2 preferably comprises special lubricating means.

In accordance with a possible embodiment, such lubricating means comprise a recess 27 included in the pin 3, for example, closed by closing means 27', in which lubricating material can be inserted, for example, oil. In the pin 3, one or more ducts 28 to convey the lubricating material in the zones with sliding movements due to relative rotations can be further provided. For example, the duct or ducts 28 may open on an outer surface 33 of the pin 3 extended portion 8 beneath the bushing 4. Thanks to the clearance that is present between the bushing 4 and the pin 3, the lubricating material can reach the further zones in which a sliding movement is present, particularly up to the rings 10' and 10", which are also rotatable relative to the pin 3.

In accordance with an embodiment, the at least one duct 28' opens on pin 3 outer surface that is different from the pin 8 extended portion. In accordance with an embodiment, the at least one duct 28' opens on a pin 3 outer surface at least one of the rings 10' or 10". Advantageously, the presence of the duct 28' in the portion coupled to the ring 10' or 10" allows keeping the pin integral in the central portion thereof that results to be most stressed. In accordance with an embodiment, two ducts 28' are providing, which put in communication the recess 27 within the pin 3 with passages that are present between the rings 10' and 10" and the pin 3, arranged at the two ends of the pin 3.

Figure 3:
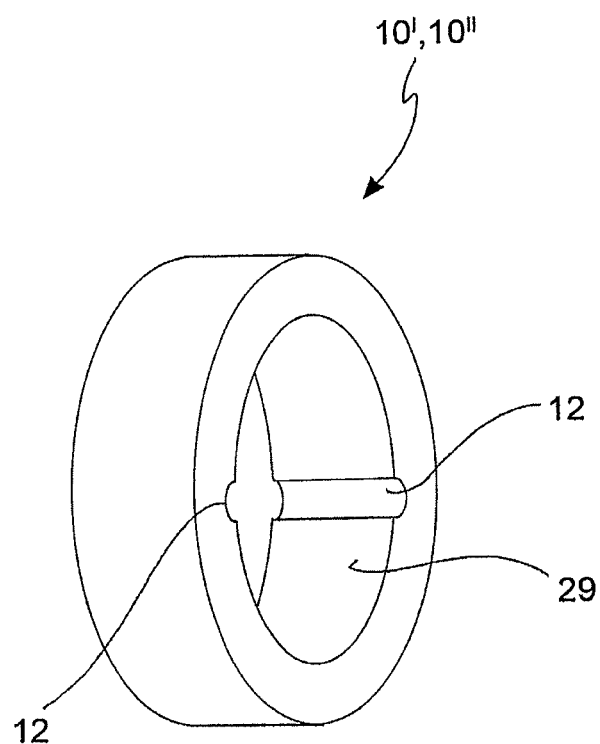
FIG. 3 is a perspective schematic view of a component of the track member according to the invention.

According to a possible embodiment, in order to further promote the lubricating material circulation, the first 10' and the second 10" rings comprise one or more channels 12 for the passage of such lubricating material at the interface with the pin 3 (FIG. 3).

The channels 12 can have several configurations. By way of example, they can be rectilinear, for example, orientated longitudinally parallel to the axis A. Alternatively, the channels 12 can be, for example, of a helical shape.

The channels 12 are preferably formed in the first 10' and in the second 10' rings at inner surfaces 29 thereof.

Advantageously, the track member 2 comprises a first 13' and a second 13" inner gasket seats. The first inner gasket seat 13' is defined by the first ring 10', the pin 3, and the bushing 4, while the second inner gasket seat 13" is defined by the second ring 10", the pin 3, and the bushing 4. Each of the inner gasket seats 13' and 13" receives therein a corresponding inner gasket acting so as to at least partially avoid the leakage of the lubricating material out of the track member 2. Particularly, the first inner gasket seat 13' houses therein a first inner gasket 14', while the second gasket seat 13" houses therein a second inner gasket 14".

The first 14' and the second 14" inner gaskets are preferably gaskets of the lip type, and still more preferably are orientated so that the lips thereof act against the first 26' and the second 26" inner side surfaces of the rings 10' and 10", respectively.

According to a particularly advantageous embodiment, the first inner gasket seat 13' is partially defined by a bushing 4 first recessed portion 15' and, similarly, the second inner gasket seat 13" is partially defined by a bushing 4 second recessed portion 15". To this aim, the bushing 4 preferably has projecting portions 30' and 30" which, still more preferably, insert in recessed portions 31' and 31" of the inner track links 11' and 11" (FIG. 2).

The inner gasket seats 13' and 13" are preferably positioned at end zones of the pin extended portion 8, in the proximity of the abutting surfaces 9' and 9".

Therefore, according to this configuration, the inner gasket seats 13' and 13" are defined by the pin 3 extended portion 8, the rings 10' and 10", the inner track links 10' and 10", the bushing 4 projecting portions 30, and the bushing 4 recessed portions 15.

Advantageously, the track member 2 comprises a first 16' and a second 16" inner spacer members. The first inner spacer member 16' is arranged in the first inner gasket seat 13' between the bushing 4, particularly the recessed portion 15' thereof, and the first ring 10', while the second spacer member 16" is arranged in the second inner gasket seat 13" between the bushing 4, particularly the recessed portion 15" thereof, and the second ring 10". The inner spacer members 16' and 16" have for example, an annular configuration. They serve to ensure the correct assembling dimension of the inner gaskets 14' and 14".

As it shall be apparent to those skilled in the art, thanks to the presence of the pin 3 extended portion 8, only part of the axial loads transmitted by the track links discharges on the inner spacer members 16' and 16". In this manner, it is possible to limit the dimensions of the inner spacer members 16' and 16" and the inner gaskets 14' and 14".

In accordance with an embodiment, the track member 2 further comprises a first 17' and a second 17" outer gasket seats.

The first outer gasket seat 17' is defined by the pin 3, the first ring 10', and the first outer track link assembly 7'. Instead, the second outer gasket seat 17" is defined by the pin 3, the second ring 10", and the second outer track link assembly 7". In accordance with an embodiment, the first outer track link assembly 7' and the second outer track link assembly 7" include only the very outer track links, which are mounted directly on the pin 3 (i.e., in other words, rings are not provided as in the case of the inner track link assemblies).

Each of the outer gasket seats 17' and 17" receives a corresponding outer gasket therein, acting so as to at least partially avoid the leakage of the lubricating material out of the track member 2 coming from the inner gasket seats 13' and 13". Particularly, the first outer gasket seat 17' houses a first outer gasket 18' therein, while the second outer gasket seat 17" houses a second outer gasket 17" (FIGS. 2 and 4) therein.

The first 18' and the second 18" outer gaskets are preferably gaskets of the lip type, and are orientated so that the lips thereof act against a first outer side surface 32' of the first ring 10' (opposite the first inner side surface 26') and against a second outer side surface 32" of the second ring 10" (opposite the second inner side surface 26"), respectively.

Advantageously, the track member 2 comprises a first 19' and a second 19" outer spacer members. The first outer spacer member 19' is arranged in the first outer gasket seat 17' between the first outer track link assembly 7' and the first ring 10', while the second outer spacer member 19" is arranged in the second outer gasket seat 17" between the second outer track link assembly 7" and the second ring 10". The outer spacer members 19' and 19" may have, for example, an annular configuration. They have the function to ensure the correct assembly dimension of the outer gaskets 18' and 18".

Figure 10A:
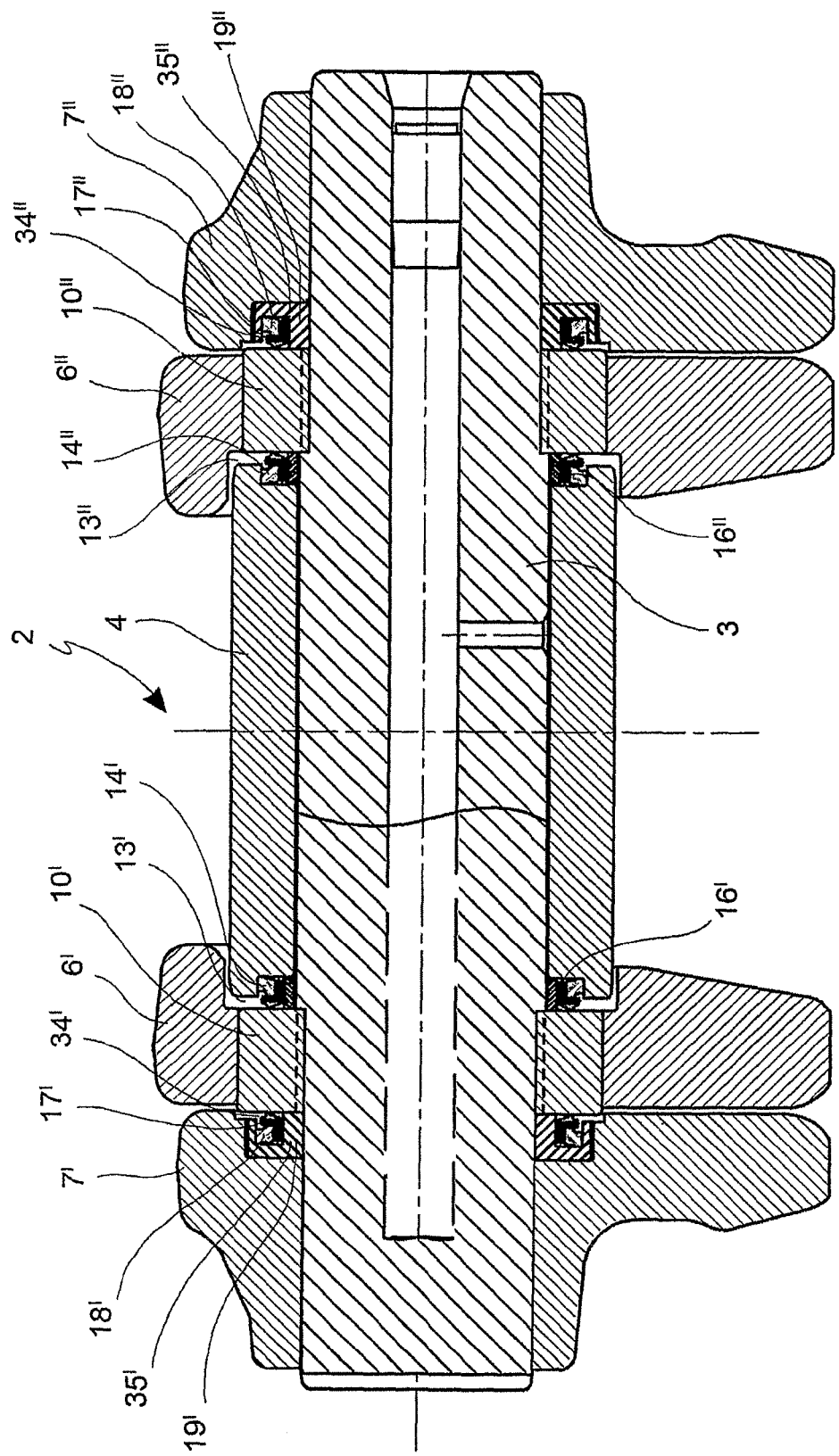
FIG. 10a is a sectional schematic view of a track member according to a further possible embodiment of the invention.
Figure 10B:
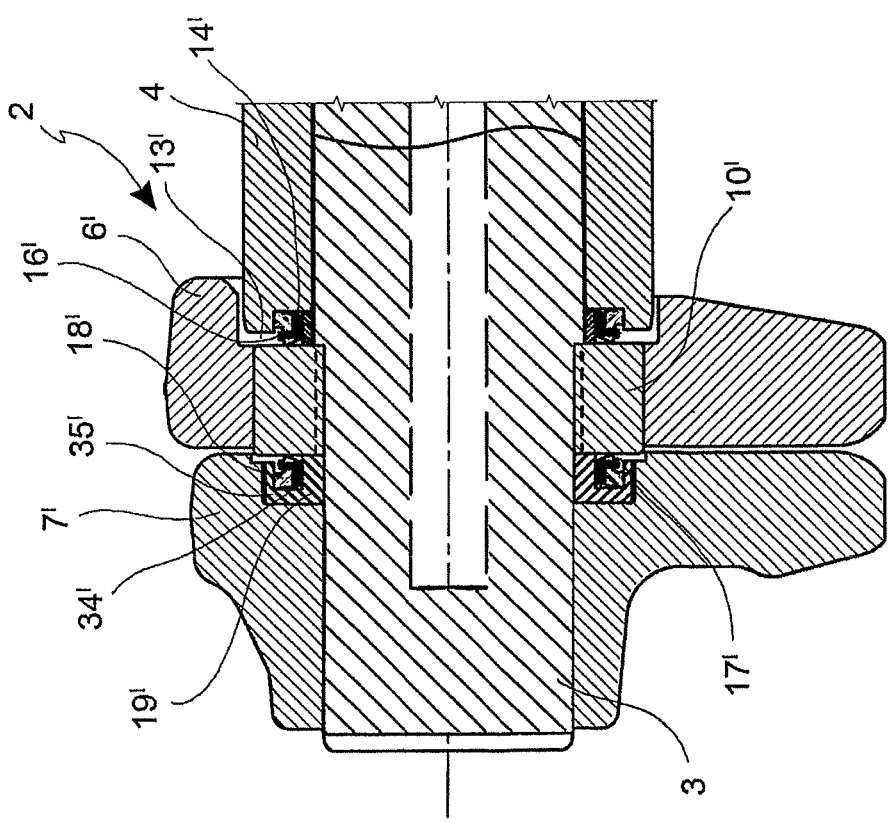

In accordance with a further possible embodiment, the first outer gasket 18' and the second outer gasket 18" are housed within a first 34' and a second 34" auxiliary outer gasket seats, respectively, which are formed in a first 35' and in a second 35" retaining rings (FIGS. 10 and 11), respectively. The first 34' and the second 34" auxiliary outer gasket seats face the bushing 4, so that the first 18' and the second 18" outer gaskets operate according to the same modes that have been described with reference to the preceding embodiments.

The retaining rings 35' and 35" are advantageously connected by interference to the pin 3. With further advantage, the retaining rings 35' and 35", under assembling conditions of the track member 2, result to be abutted in the axial direction against the first 7' and the second 7" outer track link assemblies, respectively.

According to a possible embodiment, the retaining rings 35' and 35" themselves act as spacer members 19' and 19" between the first outer track link assembly 7' and the first ring 10', and between the second outer track link assembly 7" and the second ring 10" (FIGS. 10a-10b), respectively.

According to a further possible embodiment, the first 19' and the second 19" outer spacer members are arranged within the first 34' and the second 34" auxiliary outer gasket seats of the retaining rings 35' and 35" (FIG. 11), respectively. According to such configuration, the spacer members 19' and 19" act between the first retaining ring 35' (which is in turn abutted against the first outer track link assembly 7') and the first ring 10', and between the second retaining ring 35" (which is in turn abutted against the second outer track link assembly 7") and the second ring 10", respectively.

Figure 11:
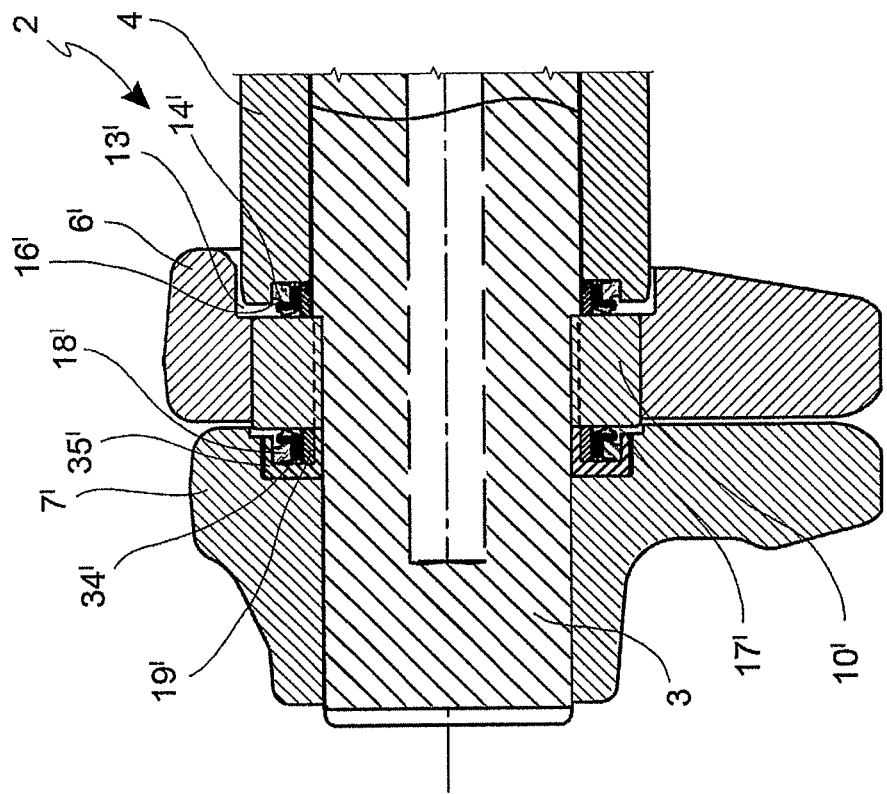
FIG. 11 is a sectional schematic view of the detail of the track member in FIG. 10b according to a further possible embodiment of the invention.

The just described solutions with reference to the embodiments in the FIGS. 10 and 11 have multiple advantages.

The auxiliary outer gasket seats 34' and 34" can be dimensioned so that the first and the second outer spacer members 19' and 19" are equal to the first 16' and the second 16" inner spacer members, and/or that the first 18' and the second 18" outer gaskets are equal to the first 14' and the second 14" inner gaskets. This makes so that the number of components of different nature that are necessary for the conduction and assembling of the track member is reduced.

Furthermore, since the retaining rings 35' and 35" substantially laterally seal the track member 2, the latter can be provided for the insertion thereof in the track 1 which is already completely preassembled and prelubricated, without requiring particular equipment for the lubrication thereof.

Furthermore, the thus-configured track member results to be particularly simple to be assembled and disassembled on/from the track.

Figure 4:
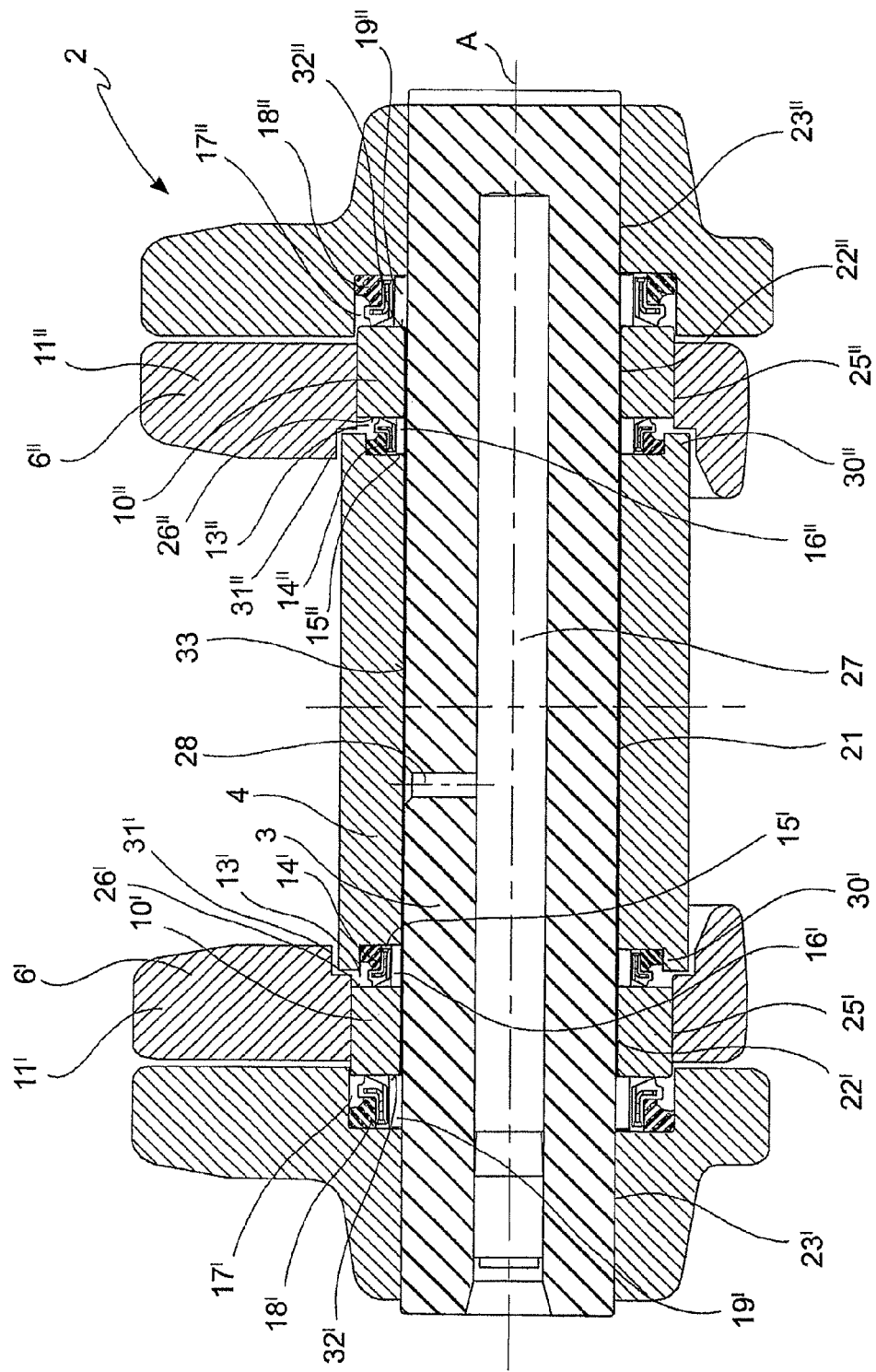
FIG. 4 is a perspective schematic view of a track member according to a further possible embodiment of the invention.
Figure 5:
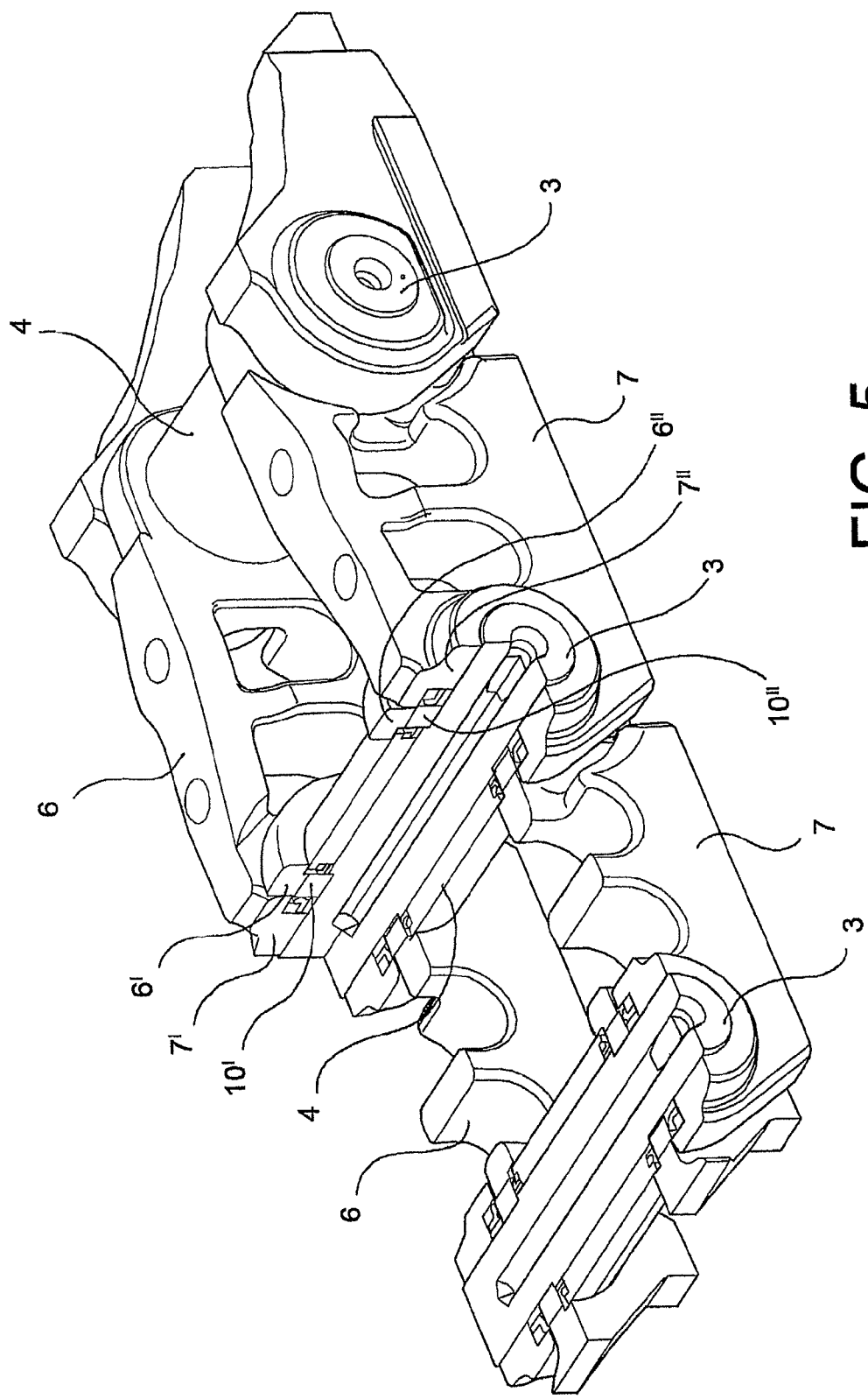
FIG. 5 illustrates a perspective view of a portion of a partially sectioned track with offset track links.
Figure 6:
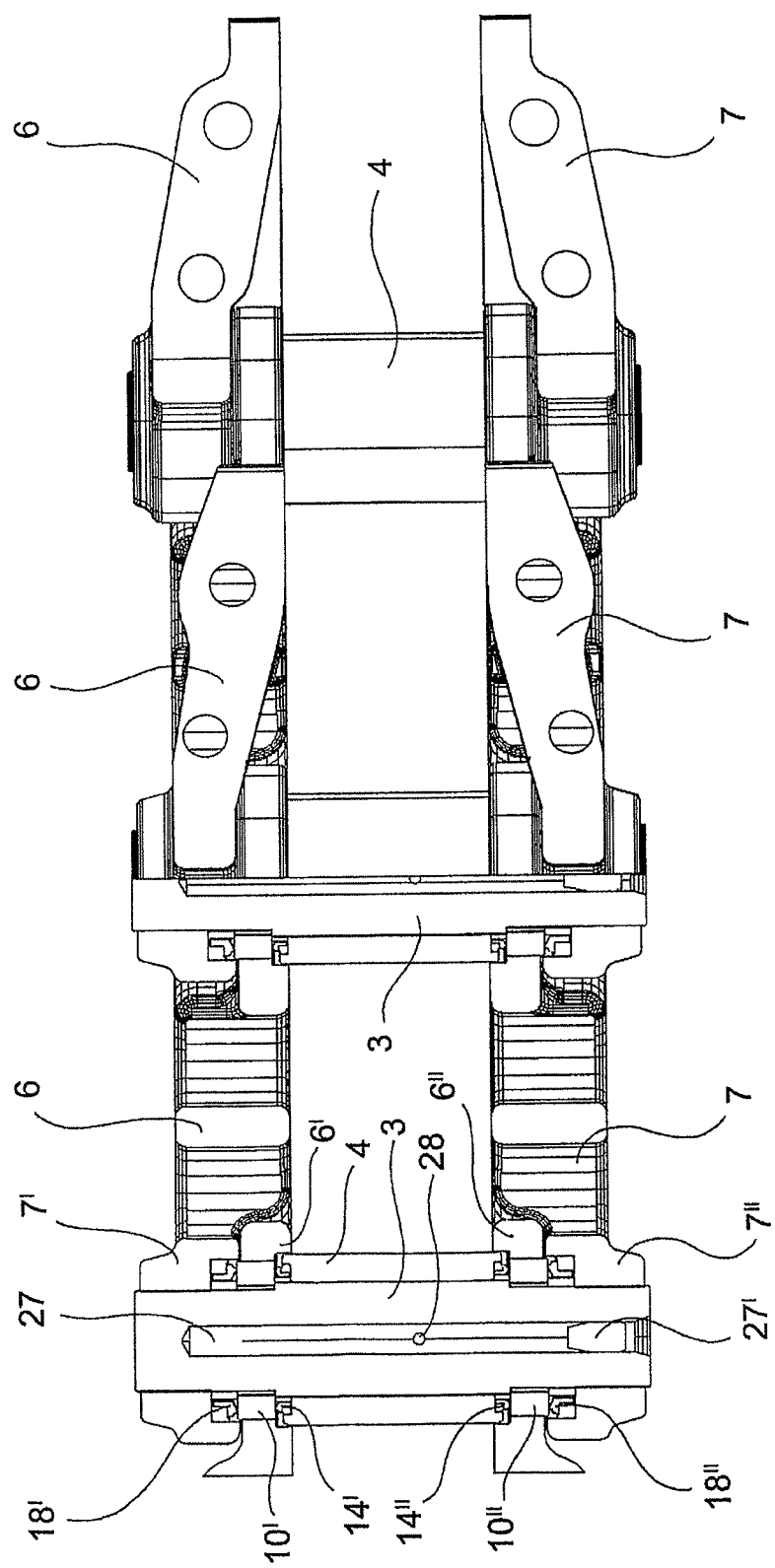
FIG. 6 illustrates a top view of the track portion of FIG. 5.
Figure 7:
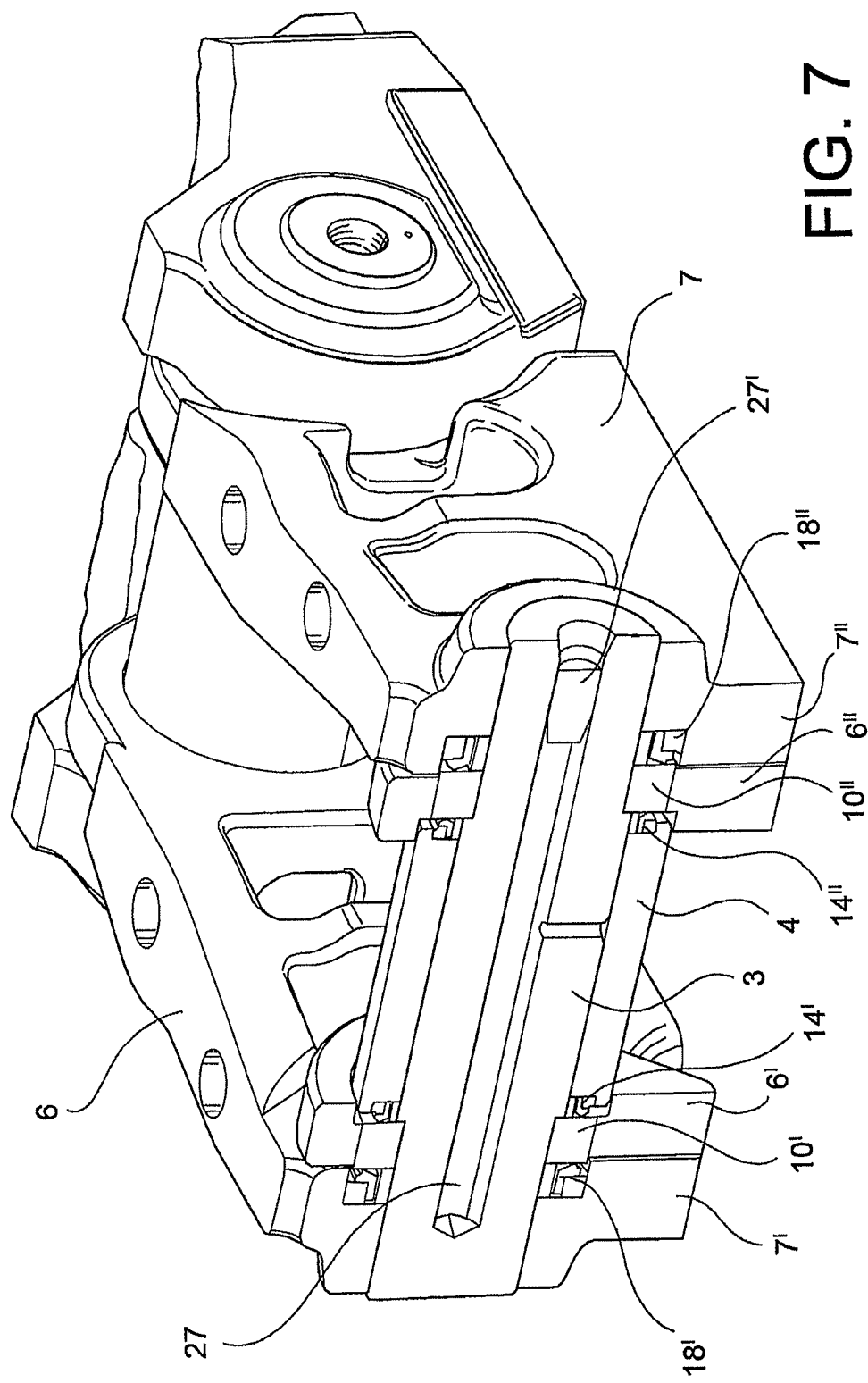
FIG. 7 illustrates a partially sectioned perspective view of a track portion according to an embodiment.
Figure 8:
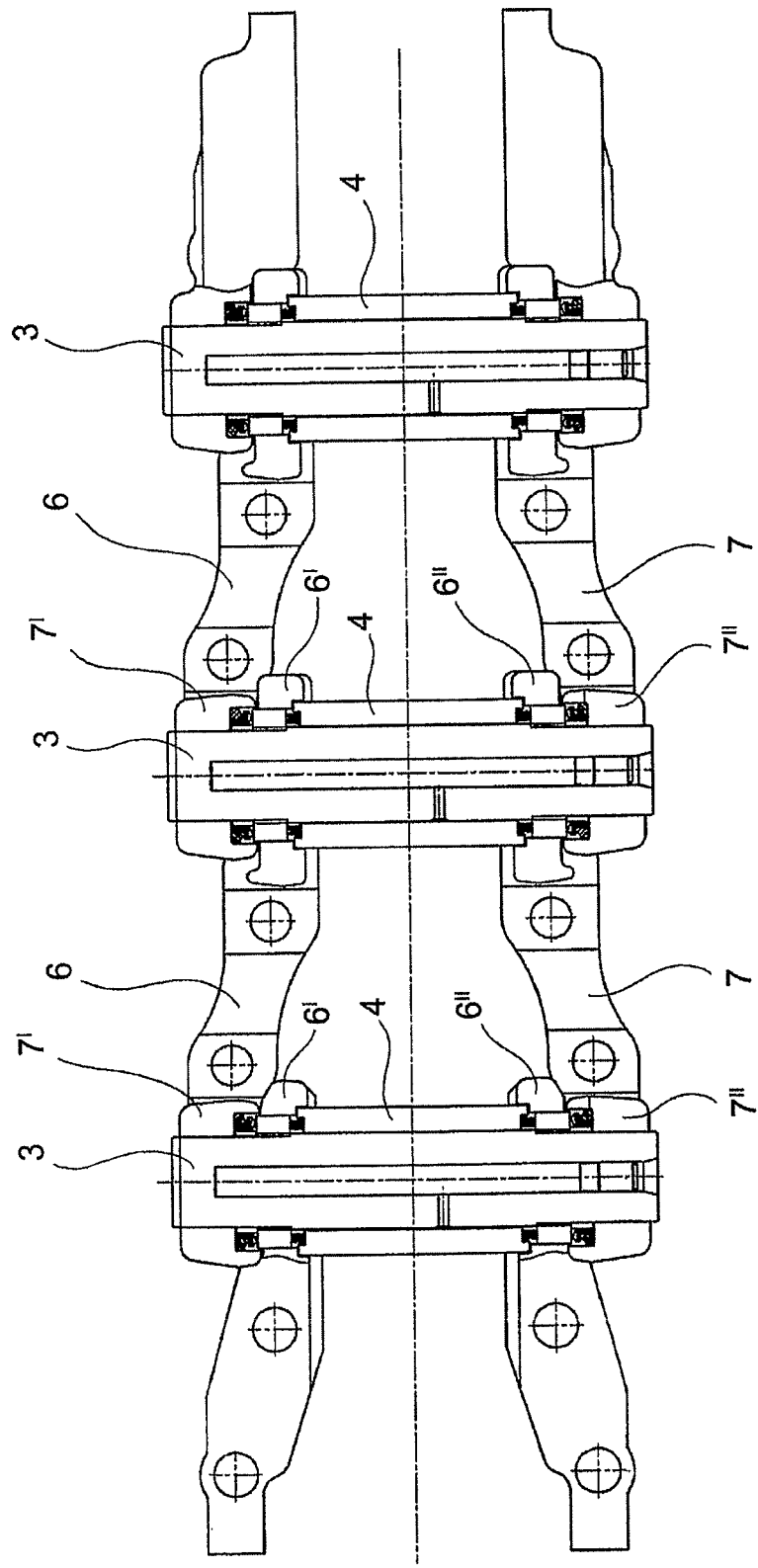
FIG. 8 illustrates a top view of a track portion according to an embodiment.
Figure 9:
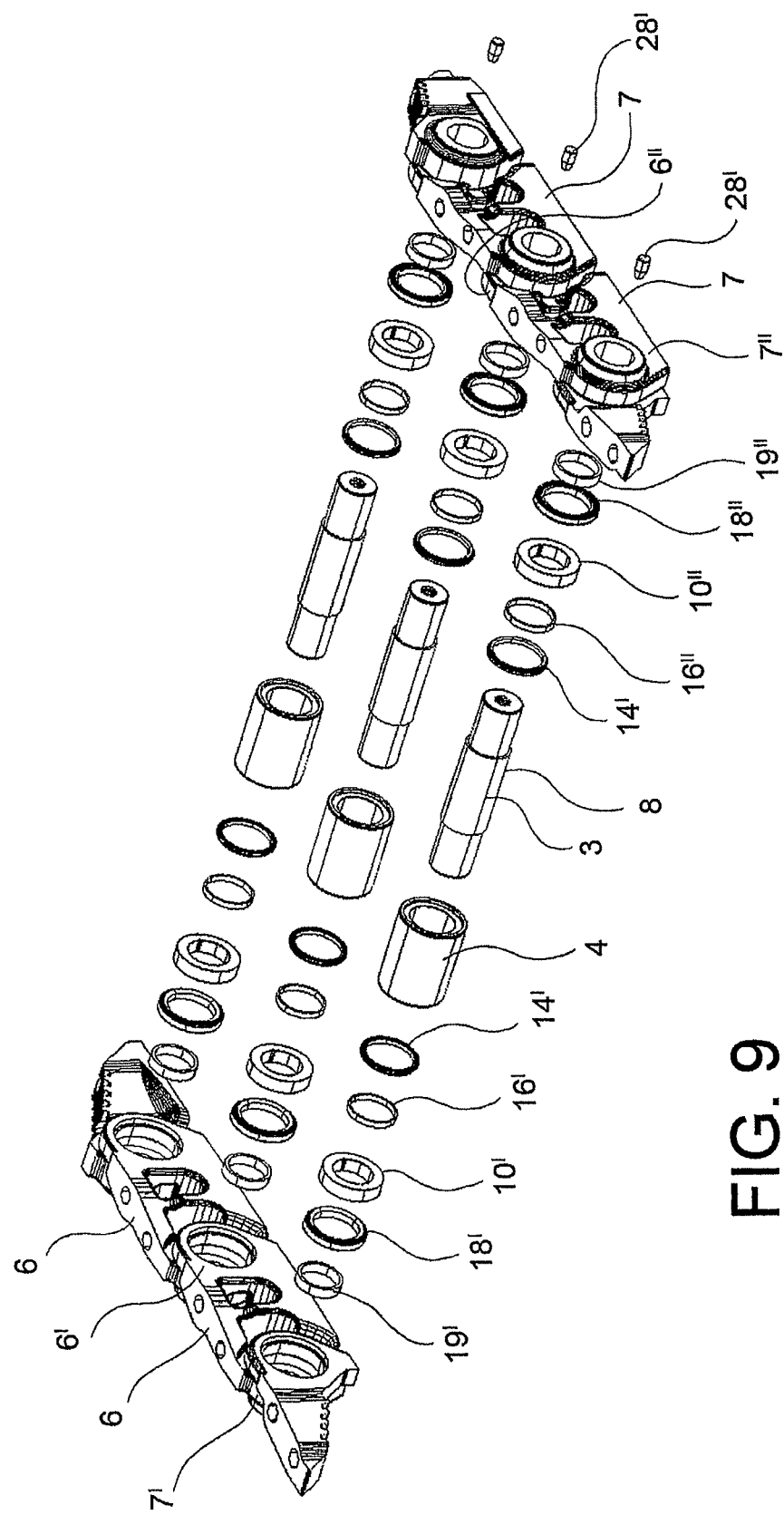
FIG. 9 illustrates an exploded, perspective view of a track portion according to an embodiment.

It shall be noted that, according to a further aspect of the present invention, it is possible to provide for a track member having all the characteristics, or one or more of the characteristics that have been hereto described, but in which the pin 3 is free from the extended portion 8. A possible example of such track member 2 is illustrated in FIG. 4.

From the description given above, those skilled in the art will be able to appreciate how the track member according to the invention allows implementing an efficient distribution of the loads in use.

Thanks to the presence of the pin extended portion, in fact, the loads of the track links transmit substantially evenly on the pin, which results to be at the same time reinforced and therefore more flexure-resistant.

Furthermore, those skilled in the art will be able to appreciate how, in the track member according to the invention, the risk of an accidental withdrawal of the pin is substantially avoided, without recurring to additional members, such as pegs or retaining rings.

Finally, those skilled in the art will be able to appreciate how, thanks to the presence of the pin extended portion, the loads of the track links are no more integrally discharged on the inner spacer members, when they are present, but, on the contrary, the latter have to be capable of substantially withdrawing only the bushing axial oscillations. Consequently, it is possible to limit the dimensions of the inner spacer members, the inner gasket seat, and the inner gaskets.

To the embodiments described above, those skilled in the art, with the aim of meeting specific, contingent needs, will be able to make a number of modifications, additions, or replacements of members with functionally equivalent other ones, without however departing from the scope of the annexed claims.

Each of the characteristics described as belonging to a possible embodiment can be implemented independently from the other embodiments described.

What is claimed is:

1. A track member for a track of a vehicle of the tracked type, comprising:
   a pin;
   a bushing associated to said pin and rotatable relative to the pin;
   a first inner track link assembly and a second inner track link assembly associated to said pin and rotatable relative to the latter, respectively arranged on two opposite sides of said bushing;
   a first outer track link assembly and a second outer track link assembly associated to said pin and rotatingly integral to the pin,
   in which said first inner track link assembly is arranged between said first outer track link assembly and said bushing, and in which said second inner track link assembly is arranged between said second outer track link assembly and said bushing, and
   wherein
   said first inner track link assembly comprises a first ring rotatable relative to said pin, and a first inner track link rotatably integral to said first ring, and wherein said second inner track link assembly comprises a second ring rotatable relative to said pin and a second inner track link rotatably integral to said second ring;
   said track member further comprises a first and a second inner gasket seats, wherein said first inner gasket seat is defined by said first ring, said pin, and said bushing, said first inner gasket seat housing a first inner gasket therein, and said second inner gasket seat housing a second inner gasket therein;
   said track member further comprises a first outer gasket seat defined by said pin, said first ring, and said first outer track link assembly, and a second outer gasket seat defined by said pin, said second ring, and said second outer track link assembly, said first outer gasket seat housing a first outer gasket therein, and said second outer gasket seat housing a second outer gasket therein;
   wherein the first inner gasket is oriented so that it acts against a first side surface of the first ring, and the first outer gasket is oriented so that it acts against a second side surface of the first ring, and the second inner gasket is oriented so that it acts against a first side surface of the second ring, and the second outer gasket is oriented so that it acts against a second side surface of the second ring; and said first inner gasket seat and said second inner gasket seat are respectively partially defined in a first and in a second recessed portions of said bushing.

2. The track member according to claim 1, in which said pin includes a pin extended portion, and said pin extended portion and said pin have cylindrical configurations, said pin extended portion being substantially coaxial to said pin and having a greater diameter than the pin diameter, so that said first and said second abutting surfaces have annular configurations.

3. The track member according to claim 1, wherein said first ring and second ring comprise one or more channels for the passage of lubricant.

4. The track member according to claim 1, comprising a first inner spacer member arranged in said first inner gasket seat between said bushing and said first ring, and a second inner spacer member arranged in said second inner gasket seat between said bushing and said second ring.

5. The track member according to claim 4, wherein said one or more channels are longitudinal or helical.

6. The track member according to claim 1, comprising a first outer gasket seat defined by said pin, said first ring, and said first outer track link assembly, and a second outer gasket seat defined by said pin, said second ring, and said second outer track link assembly, said first outer gasket seat housing a first outer gasket therein, and said second outer gasket seat housing a second outer gasket, therein.

7. The track member according to claim 1, comprising a first outer spacer member arranged in said first outer gasket seat between said first outer track link assembly and said first ring, and a second outer spacer member arranged in said second outer gasket seat between said second outer-track link assembly and said second ring.

8. The track member according to claim 1, comprising a first outer gasket seat defined by said pin, said first ring, and said first outer track link assembly, and a second outer gasket seat defined by said pin, said second ring, and said second outer track link assembly, said first outer gasket seat housing a first retaining ring therein having a first auxiliary outer gasket seat that houses a first outer gasket therein, and said second outer gasket seat housing a second retaining ring therein having a second auxiliary outer gasket seat that houses a second outer gasket therein.

9. The track member according to claim 1, wherein said first and second retaining rings are connected to said pin by interference, and abut in the axial direction against said first and second outer track link assemblies, respectively.

10. The track member according to claim 8, wherein said first and second retaining rings act as spacer members between the first outer track link assembly and the first ring, and between the second outer track link assembly and the second ring, respectively.

11. The track member according to claim 8, comprising a first and a second outer spacer members arranged within said first and said second auxiliary outer gasket seats of said first and second retaining rings respectively.

12. The track member according to claim 1, wherein the bushing has projecting portions delimiting said first and second inner gasket seat.

13. The track member according to claim 1, wherein said projecting portions are inserted in recessed portions of the inner track links.

14. A track comprising one or more track members according to claim 1.

* * * * *